US012715967B2

(12) United States Patent
Suzuki

(10) Patent No.: US 12,715,967 B2
(45) Date of Patent: Aug. 25, 2026

(54) FLUORORESIN FILM

(71) Applicant: Junkosha Inc., Kasama (JP)

(72) Inventor: Masahiro Suzuki, Kasama (JP)

(73) Assignee: JUNKOSHA, INC., Kasama (JP)

( * ) Notice: Subject to any disclaimer, the term of this patent is extended or adjusted under 35 U.S.C. 154(b) by 646 days.

(21) Appl. No.: 18/247,094

(22) PCT Filed: Sep. 27, 2021

(86) PCT No.: PCT/JP2021/035425
§ 371 (c)(1),
(2) Date: Aug. 25, 2023

(87) PCT Pub. No.: WO2022/071237
PCT Pub. Date: Apr. 7, 2022

(65) Prior Publication Data

US 2024/0067783 A1 Feb. 29, 2024

(30) Foreign Application Priority Data

Sep. 30, 2020 (JP) ................................ 2020-164961
Sep. 23, 2021 (JP) ................................ 2021-154966

(51) Int. Cl.
*C08J 5/18* (2006.01)
*C08L 27/18* (2006.01)

(52) U.S. Cl.
CPC ................ *C08J 5/18* (2013.01); *C08L 27/18* (2013.01); *C08J 2327/18* (2013.01); *C08L 2203/20* (2013.01)

(58) Field of Classification Search
CPC ......... C08J 5/18; C08J 2327/18; C08L 27/18; C08L 2203/20
See application file for complete search history.

(56) References Cited

U.S. PATENT DOCUMENTS

2006/0051568 A1 3/2006 O'Brien
2008/0269409 A1 10/2008 O'Brien
(Continued)

FOREIGN PATENT DOCUMENTS

EP 0 743 089 A2 11/1996
EP 0 743 089 A3 5/1997
(Continued)

OTHER PUBLICATIONS

Extended European Search Report Issued Oct. 2, 2024 For Corresponding European Patent Application No. 21875539.5.

*Primary Examiner* — Travis M Figg
(74) *Attorney, Agent, or Firm* — DUANE MORRIS LLP

(57) ABSTRACT

The present invention relates to a fluororesin film, and particularly to a film having a low coefficient of thermal expansion. The fluororesin film of the present invention is a fluororesin film having polytetrafluoroethylene-derived endothermic peaks in the temperature ranges of 339° C. to 355° C. and 370° C. to 390° C. in a crystal melting curve measured by differential scanning calorimetry (DSC) during heating at a heating rate of 10° C./min, wherein the crystal melting curve has no polytetrafluoroethylene-derived endothermic peak at a temperature lower than 339° C., and the film has film thickness and haze values that are within a quadrilateral region surrounded by straight lines connecting point A (0.01, 10.0), point B (0.25, 50.0), point C (0.25, 99.5), and point D (0.01, 50.0) in x-y orthogonal coordinates wherein the x-axis represents the film thickness and the y-axis represents the haze value measured in accordance with ISO14782.

20 Claims, 1 Drawing Sheet

(56) References Cited

U.S. PATENT DOCUMENTS

| | | | | |
|---|---|---|---|---|
| 2013/0158220 | A1 | 6/2013 | Uehara et al. | |
| 2015/0079343 | A1 | 3/2015 | Nakabayashi et al. | |
| 2015/0368413 | A1 | 12/2015 | Tatemichi et al. | |
| 2020/0392266 | A1* | 12/2020 | Nanba | C08F 14/26 |
| 2021/0221992 | A1* | 7/2021 | Kato | C08L 27/18 |
| 2021/0402665 | A1* | 12/2021 | Yamamoto | B29C 48/002 |

FOREIGN PATENT DOCUMENTS

| | | | | | |
|---|---|---|---|---|---|
| JP | S54156067 | A | | 12/1979 | |
| JP | 2002172316 | A | | 6/2002 | |
| JP | 2007119573 | A | | 5/2007 | |
| JP | 2008512551 | A | | 4/2008 | |
| JP | 2012045812 | A | | 3/2012 | |
| JP | 2014156599 | A | | 8/2014 | |
| JP | 2017136755 | A | | 8/2017 | |
| JP | 2020083917 | A | * | 6/2020 | B29C 49/071 |
| WO | 2013146667 | A1 | | 10/2013 | |
| WO | WO-2020022355 | A1 | * | 1/2020 | C08F 14/26 |
| WO | 2020/158373 | A1 | | 8/2020 | |
| WO | WO-2021235427 | A1 | * | 11/2021 | B32B 15/08 |

* cited by examiner

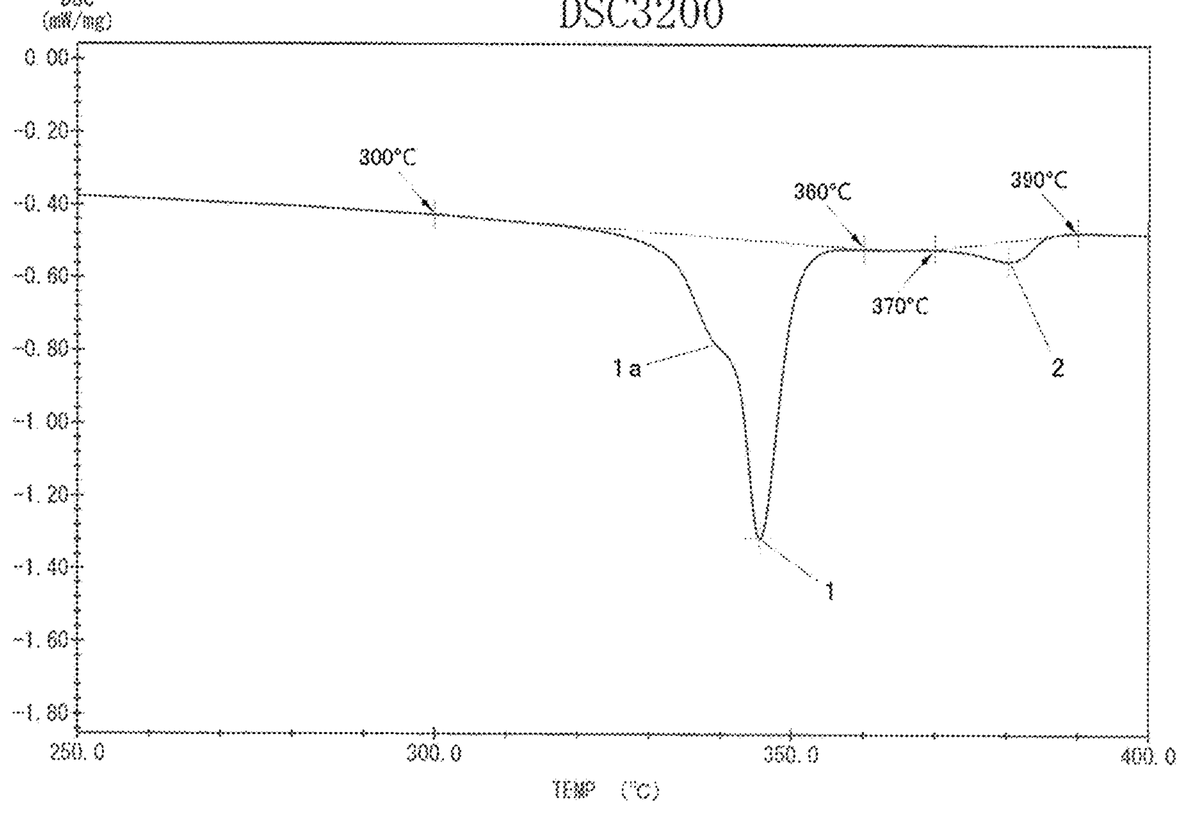
DSC3200
DSC
(mW/mg)
0.00
-0.20
-0.40
-0.60
-0.80
-1.00
-1.20
-1.40
-1.60
-1.80
250.0
300.0
350.0
400.0
TEMP (°C)
300°C
360°C
370°C
390°C
1a
1
2

FLUORORESIN FILM

CROSS-REFERENCE TO RELATED APPLICATIONS

This application is the United States national phase of International Application No. PCT/JP2021/035425 filed Sep. 27, 2021, and claims priority to Japanese Patent Application Nos. 2020-164961 filed Sep. 30, 2020, and 2021-154966 filed Sep. 23, 2021, the disclosures of which are hereby incorporated by reference in their entireties.

BACKGROUND OF THE INVENTION

Field of the Invention

The present invention relates to a fluororesin film, and particularly to a film having a low coefficient of thermal expansion.

Description of Related Art

With advancement of information technology, the amount of information and communication has increased, and high-capacity and high-speed signals have been used in communication devices. Accordingly, various printed circuit boards mounted in these devices need to cope with high-frequencies, and as the printed circuit board material used, a material having a low relative dielectric constant that increases transmission speed and a low dielectric loss tangent that enables a reduction in transmission loss is required.

In general, as a material for a printed circuit board, polyimide resin is often used because of its high insulation properties and dimensional stability. However, it is required to further cope with high-speed signal transmission or the like, and polyimide resin as the board material is also required to have a low relative dielectric constant in order to cope with high-speed signal transmission. For example, Patent Document 1 describes a polyimide film that exhibits a low dielectric constant due to small holes formed throughout the inside of the inner polyimide layer by etching away portions of the inside of the polyimide layer. However, the polyimide film is not sufficient for the required high transmission speed, and when it is used in a high-frequency region of 1 GHz or higher, a problem arises in that transmission loss occurs.

Further, Patent Document 2 describes a fluororesin board in which a dielectric layer composed of fluororesin is formed on a metal substrate such as a copper foil. Fluororesin is known to be a material having a low relative dielectric constant and dielectric loss tangent, but when it is laminated onto a metal substrate such as a copper foil, there are problems in that the coefficient of thermal expansion of the fluororesin serving as a dielectric layer is greater than that of copper that is the metal substrate, and warpage occurs due to heating during reflow. For this reason, the fluororesin could not be used as it is. Patent Document 2 describes a fluororesin board in which hollow glass beads are incorporated in the fluororesin of the dielectric layer to suppress the occurrence of warpage during reflow. However, resin containing hollow beads has a problem in that the hollow beads are easily destroyed during molding, resulting in deterioration in the dielectric properties of the resulting board.

Patent Document 3 describes a multilayer film composed of a polyimide film having excellent thermal dimensional stability and a fluororesin layer not containing a liquid crystal polymer or the like, wherein the multilayer film has a dielectric constant of 3 or less and a low coefficient of linear thermal expansion at 50 to 200° C. However, in the multilayer film of Patent Document 3, a fluororesin layer is formed by coating a polyimide film with fluororesin and the fluororesin layer is very thin, and the effect of thermal expansion of the fluororesin is suppressed to a low level. On the other hand, it was not possible for the multilayer film to sufficiently exhibit the dielectric properties characteristic of the fluororesin, such as low dielectric constant and low dielectric loss tangent.

PRIOR ART DOCUMENTS (Patent Document 1) Japanese Patent Application Publication No. 2007-119573
(Patent Document 2) WO2013-146667
(Patent Document 3) Japanese Patent Application Publication No. 2017-136755

SUMMARY OF THE INVENTION

Technical Problem

A fluororesin generally has a low dielectric constant of 2.1 to 2.4, and thus has dielectric properties suitable for signal transmission in a high frequency region. However, as described above, fluororesin has a high coefficient of linear thermal expansion (hereinafter sometimes referred to as CTE) and undergoes large dimensional changes due to temperature changes. Thus, when the fluororesin is laminated onto a metal substrate such as copper foil, there is a problem in that warpage occurs due to heating, and when a circuit having fine wiring is manufactured using the fluororesin, there is a problem that the wiring is damaged. For this reason, as a fluororesin film suitable for lamination onto a different kind of substrate, a film maintaining the dielectric properties characteristic of fluororesin has not been realized so far. The present invention provides a fluororesin film that maintains the dielectric properties of the fluororesin and exhibits a low CTE.

Technical Solution

The present inventors have earnestly examined the above-described problems, and as a result, have found that the above-described problems can be solved by controlling the crystalline state of the fluororesin film within a certain range, thereby realizing the present invention. That is, the fluorine resin film according to the present invention is a film having polytetrafluoroethylene-derived endothermic peaks in the temperature ranges of 339° C. to 355° C. and 370° C. to 390° C. in a crystal melting curve measured by differential scanning calorimetry (DSC) during heating at a heating rate of 10° C./min, wherein the crystal melting curve has no polytetrafluoroethylene-derived endothermic peak at a temperature lower than 339° C., and the film has a film thickness and a haze value that are within a quadrilateral region surrounded by straight lines connecting point A (0.01, 10.0), point B (0.25, 50.0), point C (0.25, 99.5), and point D (0.01, 50.0) in x-y orthogonal coordinates wherein the x-axis represents the film thickness and the y-axis represents the haze value measured in accordance with ISO14782.

In addition, the fluorine resin film of the present invention is preferably a film having polytetrafluoroethylene-derived endothermic peaks in the temperature ranges of 339° C. to 355° C. and 370° C. to 390° C. in a crystal melting curve measured by differential scanning calorimetry (DSC) during heating at a heating rate of 10° C./min, wherein the crystal melting curve has no polytetrafluoroethylene-derived endothermic peak at a temperature lower than 339° C., and the film has a film thickness and a haze value that are within a quadrilateral region surrounded by straight lines connecting point A (0.01, 10.0), point B (0.25, 70.0), point C (0.25, 99.5), and point D (0.01, 50.0) in x-y orthogonal coordinates wherein the x-axis represents the film thickness and the y-axis represents the haze value measured in accordance with ISO14782.

In addition, the ratio of melting energy calculated from the endothermic peak in the temperature range of 339° C. to 355° C. to melting energy calculated from the endothermic peak in the temperature range of 370° C. to 390° C. in the crystal melting curve is preferably 3:1 to 30:1.

The fluororesin film of the present invention has a relative dielectric constant of 2.1 or less at 30 GHz and a dielectric loss tangent of 0.001 or less at 30 GHz.

Furthermore, the fluororesin film of the present invention has a coefficient of linear thermal expansion of 100 ppm/° C. or less in the X-Y direction of the film at 30° C. to 250° C.

Advantageous Effects

The fluororesin film of the present invention may have small dimensional changes caused by temperature changes while maintaining excellent dielectric properties. Even when the fluororesin film is laminated onto a metal material or the like, few problems arise. The fluororesin film may be suitably used in applications such as high-frequency board materials by taking advantage of its excellent dielectric properties.

BRIEF DESCRIPTION OF THE DRAWING

FIG. 1 is an example of a crystal melting curve obtained by differential scanning calorimetry (DSC) of the fluororesin film of the present invention.

DESCRIPTION OF THE INVENTION

One embodiment of the present invention will be described below. The embodiment described below is not intended to limit the present invention, and it cannot be said that all combinations of features described in the embodiments are essential to realization of the present invention.

The fluororesin film of the present invention is preferably based on polytetrafluoroethylene (PTFE). The PTFE that is used in the present invention may be a homopolymer of tetrafluoroethylene (hereinafter referred to as "TFE") or may be a modified PTFE containing small amounts of other monomers. Examples of small amounts of monomers other than TFE contained in the modified PTFE include chlorotrifluoroethylene (CTFE), hexafluoropropylene (HFP), and perfluoroalkyl vinyl ether (PAVE), and these monomers may be contained alone or in combination of two or more.

There are two types of PTFE powder for molding: fine powder, and molding powder. The fine powder is obtained by emulsion polymerization, and has the property of being fibrillated and deformed when a strong shear stress is applied to the particles. This property is used for paste extrusion molding. For paste extrusion molding, it is general to use a method of compression-molding a paste obtained by mixing fine powder with an organic solvent called an auxiliary agent (lubricant), placing the paste into an extruder, and extruding the paste from the mold by pressure to obtain a molded product. For the fluororesin film of the present invention, it is preferable to use one obtained by mixing PTFE fine powder as a main component with an auxiliary agent, molding the mixture into a sheet shape by an extruder, and removing the auxiliary agent, followed by stretching.

As for the PTFE fine powder, it is preferable to use fine powder having a standard specific gravity (SSG) of 2.15 to 2.20, and it is preferable to use un-sintered PTFE fine powder.

When PTFE fine powder has no thermal history above the melting point of PTFE, it has an endothermic peak around 345° C. in a crystal melting curve obtained by differential scanning calorimetry (DSC). The endothermic peak around 345° C. in the crystal melting curve is considered to be due to a crystal structure similar to an extended-chain crystal (ECC), and once the PTFE crystal is melted, the endothermic peak around 345° C. disappears, and an endothermic peak around 326° C. is observed. The endothermic peak around 326° C. is considered to be due to a folded-chain crystal (FCC), and in general, it is believed that the PTFE fine powder after polymerization has a crystal structure similar to ECC, but once it is melted and recrystallized, the crystal structure is changed to FCC.

When the PTFE fine powder is molded into a sheet shape and then stretched, an endothermic peak is observed around 380° C. in the crystal melting curve obtained by DSC. It is believed that this endothermic peak around 380° C. is due to the application of shear to the molecular chain by stretching and the strong orientation of the extended-chain crystal (ECC). Hereinafter, this is sometimes referred to as high-melting-point extended-chain crystal (HECC). In order to generate the endothermic peak caused by HECC, the PTFE constituting the sheet may be rendered fibrous by stretching the PTFE sheet at high speed or at a high stretch ratio.

FIG. 1 is an example of a crystal melting curve obtained by DSC of the fluororesin film of the present invention. The fluororesin film of the present invention has a low-temperature endothermic peak 1 in the temperature range of 339° C. to 355° C. and a high-temperature endothermic peak 2 in the temperature range of 370° C. to 390° C., which are PTFE-derived peaks, in a crystal melting curve obtained by differential scanning calorimetry (DSC) of the fluororesin film during heating at a heating rate of 10° C./min. As described above, the endothermic peak in the temperature range of 339° C. to 355° C. is considered to be due to ECC, and the endothermic peak in the temperature range of 370° C. to 390° C. is considered to be due to HECC. In addition, the melting energy of the crystal may be calculated from the areas of the endothermic peaks in the crystal melting curve obtained by DSC. The ratio of melting energy calculated from the low-temperature endothermic peak 1 in the temperature range of 339° C. to 355° C. to melting energy calculated from the high-temperature endothermic peak 2 in the temperature range of 370° C. to 390° C., that is, the ratio of "the melting energy of the low-temperature peak" to "the melting energy of the high-temperature peak", is preferably 3:1 to 30:1, more preferably 4:1 to 25:1. It is believed that a crystal state in which the ratio between the melting energies in these two temperature ranges is within the above range contributes to suppressing linear thermal expansion of the PTFE film to a low level.

In addition, the fluororesin film of the present invention has a film thickness and a haze value that are within a quadrilateral region surrounded by straight lines connecting point A (0.01, 10.0), point B (0.25, 50.0), point C (0.25, 99.5), and point D (0.01, 50.0) in x-y orthogonal coordinates wherein the x-axis represents the film thickness and the y-axis represents the haze value measured in accordance with ISO14782. Preferably, the fluororesin film has a film thickness and a haze value that are within a quadrilateral region surrounded by straight lines connecting point A (0.01, 10.0), point B (0.25, 70.0), point C (0.25, 99.5), and point D (0.01, 50.0) in x-y orthogonal coordinates wherein the x-axis represents the film thickness and the y-axis represents the haze value measured in accordance with ISO14782. The haze value is obtained from the ratio of diffuse transmittance to total transmittance of the light with which the film is irradiated, and is calculated from diffuse transmittance Td and total transmittance Tt according to the following equation: Haze (%)=Td/Tt×100. The fluororesin film of the present invention may be formed by, for example, stretching a PTFE sheet to make it porous, and then densifying the sheet by compression. However, it is believed that light passing through the fluororesin film is diffused through the pores in the film, and the porous state in which the relationship between the thickness and haze of the film is within the above-described range contributes to maintaining the dielectric properties of PTFE and suppressing the linear thermal expansion of PTFE.

The fluororesin film of the present invention has no PTFE-derived endothermic peak at a temperature lower than 339° C. in the crystal melting curve obtained by DSC. The fact that the fluororesin film has no PTFE-derived endothermic peak at a temperature lower than 339° C. indicates that the PTFE constituting the film has no thermal history above the melting point (endothermic peak temperature around 345° C. observed by DSC), and that the crystal structure of the formed film is maintained in a specific state. In addition, the crystal melting curve in FIG. 1 is an example in which there is an endothermic peak 1 around 345° C. and a shoulder appears at a temperature lower than the peak temperature. The PTFE fine powder used as the raw material of the film may be composed of powders having different molecular weights, and a shoulder may appear in an endothermic peak such as the endothermic peak 1 in FIG. 1. Here, the peak refers to a curve having an extreme value, and the shoulder refers to a curve that does not have an extreme value, like the curve 1*a* in FIG. 1. In the present invention, if a shoulder appears in the peak in the DSC crystal melting curve, the shoulder is not regarded as a peak.

The fluororesin film of the present invention preferably does not contain or hardly contains resins other than fluororesin or additives such as fillers. This makes it possible to maintain dielectric properties such as low dielectric constant and low dielectric loss tangent, which are characteristics of fluororesin. The fluororesin film of the present invention has a relative dielectric constant of about 2.1 or less at 30 GHz and a dielectric loss tangent of about 0.001 or less at 30 GHz. In addition, the fluororesin film has a dielectric constant of about 2.1 or less at 85 GHz and a dielectric loss tangent of about 0.001 or less at 85 GHz. The fluororesin film of the present invention has excellent dielectric properties in a broad frequency band.

The fluororesin film of the present invention has a low coefficient of linear thermal expansion of 100 ppm/° C. or less in the X-Y direction of the film at 30° C. to 250° C., and thus may have small dimensional changes caused by temperature changes. Since it is not necessary to laminate another layer such as polyimide or glass cloth onto the fluororesin in order to suppress linear thermal expansion of the fluororesin, it is possible to make a thin film. The thickness of the fluororesin film of the present invention is 5 μm to 250 μm, preferably 10 μm to 200 μm, more preferably 20 to 200 μm.

Hereinafter, an example of a method for making the fluororesin film of the present invention will be described.

[Formation of Preform]

A PTFE preform that is used to make the fluororesin film of the present invention may be formed by a generally known method. For example, a paste is prepared by mixing un-sintered PTFE fine powder with an auxiliary agent, and the paste is compression-molded at room temperature to obtain a preform. The auxiliary agent is added to PTFE fine powder to form a paste which is extrudable, and as for the auxiliary agent it is preferable to use one that suppresses volatilization before molding and may be easily removed by volatilization after molding. An easy-to-use auxiliary agent has an initial boiling point (IBP) of about 150° C. to 250° C., and a petroleum-based solvent is preferably used.

[Extrusion Molding]

The prepared preform is loaded into an extruder, and the paste is extruded from the extrusion mold by applying pressure to obtain a molded PTFE sheet. The thickness of the sheet may be appropriately determined depending on the film thickness after stretching and compression, and the extrusion pressure is preferably high enough to promote fibrillation of the PTFE particles. The temperature of the extrusion mold may be room temperature, and, for example, extrusion molding may be performed in the temperature range of about 25° C. to 80° C. The molded un-sintered PTFE sheet is heated at a temperature lower than the melting point of PTFE, and the auxiliary is volatilized. After removal of the auxiliary agent, the PTFE sheet contains pores remaining after removal of the auxiliary agent.

[Stretching of Sheet]

The PTFE sheet from which the auxiliary agent has been removed is stretched at a temperature lower than the melting point of PTFE. It is known that, as an un-sintered PTFE sheet is stretched, the entire sheet becomes porous starting from the pores remaining after removal of the auxiliary agent. For the fluororesin film of the present invention, a porous PTFE sheet having a stretch ratio of about 15 to 225 times may be used, and the stretch ratio is more preferably about 18 to 145 times. This stretch ratio is expressed as an area ratio of (stretch ratio in X-direction x stretch ratio in Y-direction). The thickness of the porous PTFE sheet may be about 0.03 mm to 3 mm, more preferably about 0.04 mm to 2 mm. The density of the porous PTFE sheet may be, for example, 0.1 g/cm$^3$ to 0.7 g/cm$^3$, more preferably 0.2 g/cm$^3$ to 0.5 g/cm$^3$.

[Compression of Sheet]

The porous PTFE sheet described above is preferably compressed at a temperature lower than the melting point of PTFE. For example, the compression process is preferably in the temperature range of about 80° C. to 340° C. The compression process is performed, for example, by passing the porous PTFE sheet between a pair of pressing rolls and holding the porous PTFE sheet between the pair of pressing rolls so that a constant load is applied. The load that is applied to the pressing rolls is preferably set so that an appropriate pressure is applied to the PTFE sheet depending on the required thickness and density of the PTFE sheet after compression. For example, the load may be in the range of 5 MPa to 400 MPa. Furthermore, the compression process may be performed at one time using a pair of pressing rolls, or may also be performed in several stages using a plurality of pairs of pressing rolls. By this compression treatment, the size and distribution of pores in the porous PTFE sheet are changed and the sheet is densified. The density of the PTFE film prepared in this way is 1.8 g/cm$^3$ to 2.4 g/cm$^3$. The thickness of the fluororesin film obtained in this way may be 5 μm to 250 μm, preferably 10 μm to 200 μm, more preferably 20 to 200 μm.

The present invention will be described in more detail with reference to the following examples. In addition, the following examples are for explaining the present invention and the present invention is not limited by the following examples.

EXAMPLES

<Differential Scanning Calorimetry (DSC)>

DSC was performed in accordance with JIS K 7122 using a DSC3200 manufactured by NETZSCH JAPAN. 5 mg to 10 mg of a fluororesin film was cut out and used as a measurement sample. The measurement sample was clamped in an aluminum pan to prevent the effect of heat shrinkage. Data obtained during heating from room temperature to 400° C. at a heating rate of 10° C./min were used.

The endothermic peak temperatures were checked from the obtained crystal melting curve (DSC curve). The baseline of the DSC curve was determined, and to calculate the heat of transition, the melting energy from each peak area was measured according to JIS K 7122. When the baseline of the DSC curve is approximately straight, the point at which the DSC curve departs from the baseline is taken as the point at 300° C., the point at which the DSC curve returns to the baseline is taken as the point at 360° C., and the endothermic peak area in the low-temperature range of 339° C. to 355° C. may be determined by connecting the two points by a straight line. Similarly, the peak area as the baseline of the endothermic peak in the high-temperature range of 370° C. to 390° C. may be determined by connecting the points at 370° C. and 390° C. on the DSC curve by a straight line.

From the peak areas determined in this way, the melting energy of the low-temperature peak and the melting energy of the high-temperature peak were determined.

<Haze Measurement>

Haze measurement was performed in accordance with ISO14782. An HZ-V3 haze meter manufactured by Suga Test Instruments Co., Ltd. was used as the test device. The light source was D65, the measurement diameter was φ14 mm, and haze measurement was performed using a double beam method. Measurements were made at three sites per sample and averaged. The measurement environment was set at a temperature of 23° C.±2° C. and a relative humidity (RH) of 50%±10%.

<Measurement of CTE>

The coefficient of linear thermal expansion (CTE) indicates the rate of change in the length among the coefficients of thermal expansion. CTE was measured by a thermomechanical analysis (TMA) method in accordance with ISO11359-2. In the TMA method, CTE is determined by setting a measurement sample in a tensile probe, heating the measurement sample while applying a constant load thereto, and measuring the expansion-induced change in the length of the measurement sample.

CTE is calculated using the following equation (1).

$$CTE = (\Delta L/L0) \times (1/\Delta T) \times 10^6 \quad (1)$$

wherein ΔL represents the change in length of the measurement sample when the temperature is changed from temperature T1 to T2, L0 represents the length of the measurement sample before measurement, and ΔT represents the change in temperature (T2−T1)° C.

The measurement sample is preferably used for measurement after it is subjected to an annealing treatment for 1 hour in a thermostat at 270° C. as a pretreatment to remove residual strain.

The measurement was performed under the following conditions using a TMA4000S (manufactured by NETZSCH JAPAN) as the measuring device.

Measurement temperature range: room temperature to 250° C.

Heating rate: 10° C./min

Tensile load: 0.5 g

Measurement sample size: 15 mm length×5 mm width (sample dimensions including a chuck part: 20 mm length×5 mm width)

Measurement Method

The measurement sample is heated from room temperature to 250° C., and then cooled to room temperature at a rate of 20° C./min. Thereafter, the measurement sample is heated to 250° C. again at a rate of 10° C./min, and the CTE is determined from the change in length during the second heating.

A measurement sample was prepared and measured in each of the X-direction and the Y-direction of the film, and the CTE in the range of 30° C. to 250° C. was determined. A greater value among the values measured in the X-direction and the Y-direction was selected as the CTE of the X-Y direction of the film.

<Measurement of Dielectric Properties>

Relative dielectric constant and dielectric loss tangent were measured by the balanced-type circular disk resonator method. The measurement was performed under the following conditions using a vector network analyzer N5251A (manufactured by Keysight Technologies) as a measuring device.

Measurement sample shape: 30 mm×30 mm

Sweep frequency: 100 MHz to 100 GHz

Circular disk diameter: 15 mm

Measurement environment: −40° C., room temperature (22° C., 60% RH), and 125° C.

Example 1

An un-sintered porous PTFE sheet stretched at an area stretch ratio of 36 times was prepared. The porous PTFE sheet was passed between a pair of pressure rolls and compressed at a compression temperature of 340° C. A constant load of 10 MPa was applied between the pressing rolls. The thickness of the obtained fluororesin film was 0.24 mm.

Example 2

An un-sintered porous PTFE sheet stretched at an area stretch ratio of 36 times was prepared. The porous PTFE sheet was passed between a pair of pressure rolls and compressed at a compression temperature of 340° C. A constant load of 10 MPa was applied between the pressing rolls. The thickness of the obtained fluororesin film was 0.018 mm.

Example 3

An un-sintered porous PTFE sheet stretched at an area stretch ratio of 50 times was prepared. The porous PTFE sheet was passed between a pair of pressure rolls and compressed at a compression temperature of 120° C. A constant load of 60 MPa was applied between the pressing rolls. The thickness of the obtained fluororesin film was 0.015 mm.

Example 4

An un-sintered porous PTFE sheet stretched at an area stretch ratio of 50 times was prepared. The porous PTFE sheet was passed between a pair of pressure rolls and compressed at a compression temperature of 300° C. A constant load of 10 MPa was applied between the pressing rolls. The thickness of the obtained fluororesin film was 0.25 mm.

Example 5

An un-sintered porous PTFE sheet stretched at an area stretch ratio of 30 times was prepared. The porous PTFE sheet was passed between a pair of pressure rolls and compressed at a compression temperature of 320° C. A constant load of 10 MPa was applied between the pressing rolls. The thickness of the obtained fluororesin film was 0.05 mm.

Example 6

An un-sintered porous PTFE sheet stretched at an area stretch ratio of 30 times was prepared. The porous PTFE sheet was passed between a pair of pressure rolls and compressed at a compression temperature of 120° C. A constant load of 200 MPa was applied between the pressing rolls. The thickness of the obtained fluororesin film was 0.04 mm.

Example 7

An un-sintered porous PTFE sheet stretched at an area stretch ratio of 100 times was prepared. The porous PTFE sheet was passed between a pair of pressure rolls and compressed at a compression temperature of 300° C. A constant load of 20 MPa was applied between the pressing rolls. The thickness of the obtained fluororesin film was 0.05 mm.

Comparative Example 7

An un-sintered porous PTFE sheet stretched at an area stretch ratio of 50 times was prepared. The porous PTFE sheet was passed between a pair of pressure rolls and compressed at a compression temperature of 360° C. A constant load of 10 MPa was applied between the pressing rolls. The thickness of the obtained fluororesin film was 0.05 mm.

Table 1 below shows the results of measuring DSC, haze, and coefficient of linear thermal expansion for the fluororesin film obtained in each of the Examples and the Comparative Example.

TABLE 1

| | Film thickness (mm) | Haze (%) | DSC peak temperature Low-temperature peak/high-temperature peak (° C.) | Melting energy Low-temperature peak/high-temperature peak (J/g) | Melting energy ratio (Low-temperature peak): (high-temperature peak) | Coefficient of linear thermal expansion (30 to 250° C.) (ppm/° C.) |
|---|---|---|---|---|---|---|
| Example 1 | 0.24 | 84 | 346/380 | 44.2/2.6 | 17.0:1 | 50 |
| Example 2 | 0.018 | 14 | 346/380 | 43.0/2.8 | 15.4:1 | 59 |
| Example 3 | 0.015 | 46 | 345/380 | 27.9/4.2 | 6.6:1 | 20 |
| Example 4 | 0.25 | 91 | 345/379 | 58.8/2.1 | 28.2:1 | 48 |
| Example 5 | 0.05 | 30 | 345/379 | 53.8/2.3 | 23.4:1 | 54 |
| Example 6 | 0.04 | 40 | 345/379 | 55.6/2.4 | 23.2:1 | 62 |
| Example 7 | 0.05 | 42 | 346/381 | 29.2/7.0 | 4.2:1 | 15 |
| Comparative Example 1 | 0.05 | 28 | 328/380 | —/2.7 | — | 140 |

All of the fluororesin films of the Examples had a coefficient of linear thermal expansion of 100 ppm/° C. or less in the X-Y direction of the film at 30° C. to 250° C. In addition, the relative dielectric constant values of the fluororesin films of the Examples, measured at 30 GHz, were 2.03 to 2.06 in the temperature range of −40° C. to 125° C., and the measured dielectric loss tangent values thereof were 0.0001 in the temperature range of −40° C. to 125° C. Furthermore, the relative dielectric constant values measured at 85 GHz were 2.01 to 2.04 in the temperature range of −40° C. to 125° C., and the measured dielectric loss tangent values were 0.0001 to 0.0003 in the temperature range of −40° C. to 125° C.

The film of any Example had stable dielectric properties, including a relative dielectric constant of 2.1 or less and a dielectric loss tangent of 0.001 or less, in a wide temperature range, and maintained excellent dielectric properties characteristic of fluororesin.

INDUSTRIAL APPLICABILITY

The fluororesin film of the present invention maintains the excellent dielectric properties of the fluororesin and undergoes small dimensional changes caused by temperature changes, and thus it may be suitably used in applications such as high-frequency board materials, particularly for lamination onto metal materials having a low coefficient of linear thermal expansion.

DESCRIPTION OF REFERENCE NUMERALS

1: endothermic peak at 339° C. to 355° C.; 2: endothermic peak at 370° C. to 390° C.

The invention claimed is:

1. A fluororesin film having polytetrafluoroethylene-derived endothermic peaks in the temperature ranges of 339° C. to 355° C. and 370° C. to 390° C. in a crystal melting curve measured by differential scanning calorimetry (DSC) during heating at a heating rate of 10° C./min, wherein the crystal melting curve has no polytetrafluoroethylene-derived endothermic peak at a temperature lower than 339° C., and the film has film thickness and haze values that are within a quadrilateral region surrounded by straight lines connecting point A (0.01, 10.0), point B (0.25, 50.0), point C (0.25, 99.5), and point D (0.01, 50.0) in x-y orthogonal coordinates wherein the x-axis represents the film thickness and the y-axis represents the haze value measured in accordance with ISO14782.

2. A fluororesin film having polytetrafluoroethylene-derived endothermic peaks in the temperature ranges of 339° C. to 355° C. and 370° C. to 390° C. in a crystal melting curve measured by differential scanning calorimetry (DSC) during heating at a heating rate of 10° C./min, wherein the crystal melting curve has no polytetrafluoroethylene-derived endothermic peak at a temperature lower than 339° C., and the film has film thickness and haze values that are within a quadrilateral region surrounded by straight lines connecting point A (0.01, 10.0), point B (0.25, 70.0), point C (0.25, 99.5), and point D (0.01, 50.0) in x-y orthogonal coordinates wherein the x-axis represents the film thickness and the y-axis represents the haze value measured in accordance with ISO14782.

3. The fluororesin film according to claim 1, wherein a ratio of melting energy calculated from the endothermic peak in the temperature range of 339° C. to 355° C. to melting energy calculated from the endothermic peak in the temperature range of 370° C. to 390° C. in the crystal melting curve is 3:1 to 30:1.

4. The fluororesin film according to claim 1, having a relative dielectric constant of 2.1 or less at 30 GHz.

5. The fluororesin film according to claim 1, having a dielectric loss tangent of 0.001 or less at 30 GHz.

6. The fluororesin film according to claim 1, having a coefficient of linear thermal expansion of 100 ppm/° C. or less in an X-Y direction of the film at 30° C. to 250° C.

7. The fluororesin film according to claim 1, having a film thickness of 5 μm to 250 μm.

8. The fluororesin film according to claim 2, wherein a ratio of melting energy calculated from the endothermic peak in the temperature range of 339° C. to 355° C. to melting energy calculated from the endothermic peak in the temperature range of 370° C. to 390° C. in the crystal melting curve is 3:1 to 30:1.

9. The fluororesin film according to claim 2, having a relative dielectric constant of 2.1 or less at 30 GHz.

10. The fluororesin film according to claim 3, having a relative dielectric constant of 2.1 or less at 30 GHz.

11. The fluororesin film according to claim 8, having a relative dielectric constant of 2.1 or less at 30 GHz.

12. The fluororesin film according to claim 2, having a dielectric loss tangent of 0.001 or less at 30 GHz.

13. The fluororesin film according to claim 3, having a dielectric loss tangent of 0.001 or less at 30 GHz.

14. The fluororesin film according to claim 8, having a dielectric loss tangent of 0.001 or less at 30 GHz.

15. The fluororesin film according to claim 2, having a coefficient of linear thermal expansion of 100 ppm/° C. or less in an X-Y direction of the film at 30° C. to 250° C.

16. The fluororesin film according to claim 3, having a coefficient of linear thermal expansion of 100 ppm/° C. or less in an X-Y direction of the film at 30° C. to 250° C.

17. The fluororesin film according to claim 8, having a coefficient of linear thermal expansion of 100 ppm/° C. or less in an X-Y direction of the film at 30° C. to 250° C.

18. The fluororesin film according to claim 2, having a film thickness of 5 μm to 250 μm.

19. The fluororesin film according to claim 3, having a film thickness of 5 μm to 250 μm.

20. The fluororesin film according to claim 8, having a film thickness of 5 μm to 250 μm.

* * * * *